March 11, 1958 R. C. TURTLE 2,826,092
ROTARY DRIVE CONTROL MECHANISMS
Filed Oct. 26, 1954 2 Sheets-Sheet 1

Inventor
Rupert Clifford Turtle,
By
Pierce, Scheffler & Parker
his Attorneys

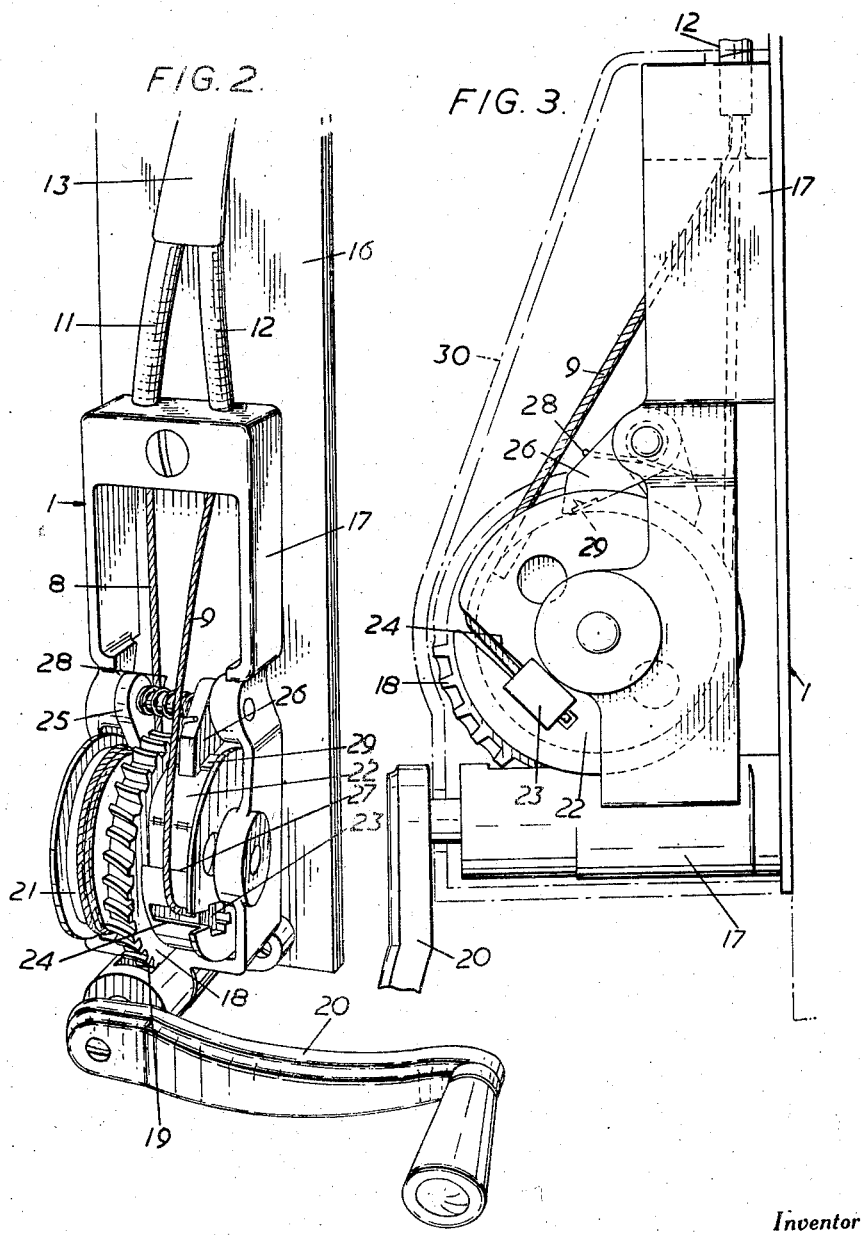

United States Patent Office 2,826,092
Patented Mar. 11, 1958

2,826,092
ROTARY DRIVE CONTROL MECHANISMS

Rupert Clifford Turtle, East Croydon, England, assignor to Arens Controls Limited, East Croydon, England, a British company Application October 26, 1954, Serial No. 464,704

Claims priority, application Great Britain November 2, 1953

5 Claims. (Cl. 74—505)

This invention is concerned with improvements in or relating to rotary control mechanism, and more particularly rotary control mechanism for actuating a cable or like drive to apparatus to be controlled.

It is sometimes desirable to control a given apparatus, such for instance as means for actuating a window, louvre, damper or the like, from a control station by means of flexible transmission means and to provide for movement in two directions, e. g. an opening movement and a closing movement, to be transmitted without danger of slipping and this presents difficulties when adapting known forms of cable or like transmission arrangements. A further difficulty which arises in known arrangements is that the cable or like mechanism is liable to be subjected to undesirable strain particularly if efforts are made to reduce slipping to a minimum or if there is any likelihood of the control mechanism being subjected to any over-winding.

One of the objects of the present invention is to provide improved rotary control means for flexible transmission means wherein the above mentioned difficulties are wholly overcome or very greatly reduced.

According to the present invention there is provided rotary control mechanism comprising a rotary assembly, means for anchoring two cable ends to said assembly so that pursuant to rotation of the latter one cable end is wound in and the other is payed out, and means for preventing rotation of said assembly beyond a position in which the respective cable ends have been wound-in and payed out respectively to a predetermined maximum extent.

It will be readily appreciated that in some cases the movement to be transmitted by the control mechanism will represent a movement greater than that generated by one complete revolution of the rotary assembly, and in such cases it will not suffice merely to provide stop devices which necessarily come into operation whenever the rotary assembly assumes a particular angular position with respect to its housing. In order to deal with this requirement the means for preventing rotation beyond certain limits are so disposed that a stop for arresting movement in one direction is maintained in an inoperative condition until there is less than one convolution of the cable end which is being payed-out by rotation in that direction whilst the stop for arresting movement in the other direction is maintained in an inoperative condition until there is less than one convolution of the cable end which is being payed out by rotation in the last mentioned direction.

It is at present preferred that the means for limiting the rotation of the rotary assembly within the aforesaid limits, should comprise two oppositely acting pawls disposed for engagement with slots notches or the like located in those parts of the assembly on which the cable ends are to be wound, with the result that so long as the cable end concerned extends over the slot the associated pawl cannot enter the slot and the rotary assembly is free to rotate in both directions so far as that pawl is concerned. As soon however as the rotary assembly has been rotated to a position in which the slot is exposed then rotation in a direction moving the slot towards the pawl will be arrested as soon as the pawl registers with the slot.

The aforesaid cable ends may consist of the ends of a single cable which in use extends around the device to be controlled or they may consist of the ends of two different cables of which the opposite ends are in use connected to a rotary device at the controlled end of the apparatus, the latter arrangement being usually preferable as this provides for positive rotation of the controlled device pursuant to rotation of the control mechanism in either direction, i. e. taking up either cable at the control end results in positive unwinding at the controlled end.

The aforesaid rotary assembly may be driven through the medium of worm and worm-wheel gearing in conjunction for instance with a manually operable crank handle, or such assembly may be driven either directly or indirectly by any other suitable means.

The aforesaid rotary assembly may comprise a single drum and the said cable ends may be disposed for being wound onto different parts of the periphery of the drum, it being desirable to ensure that there is no overlapping of the convolutions as it is important for the purpose of avoiding undue strain in the cables to ensure that pursuant to rotation of the assembly the amount of one cable end which is payed out is always equal to the amount of the other cable end which is wound in.

In cases where the rotary assembly is actuated through gearing, e. g. worm and worm-wheel gearing, it is preferred to provide a gear wheel between those zones of the rotary assembly which are provided for engagement by the cable ends.

The aforesaid rotary assembly, e. g. a gear wheel and zones for receiving the said cable ends may be of an integral nature but it is preferred that the parts for receiving the cables should be separable from one another so that adjustments can be made in thier relative positions and thus also afford provision for varying the relationship between the said cable ends. Thus for instance the parts for engagement by the cable ends may comprise two drum portions which in use are secured in concentric relationship for rotation as a unit but which can nevertheless be freed from one another so that one can be turned angularly with respect to the other for the purpose of paying out or taking up one cable end with respect to the other one during initial setting-up operations.

The aforesaid cable ends may be anchored to the rotary assembly in any convenient way but it is at present preferred that this be achieved by attaching terminal blocks to the cable ends and providing recesses in the end faces of the cable-engaging parts of the assembly for receiving said terminal blocks.

In order that the present invention may be well understood one preferred embodiment will now be described in application to window control mechanism and with reference to the accompanying drawings in which:

Figure 2 is an enlarged perspective view of the in-put end of the control mechanism shown in Figure 1 but with a cover plate removed to exposed internal parts.

Figure 3 is a side view of the mechanism shown in Figure 2.

Figure 1:
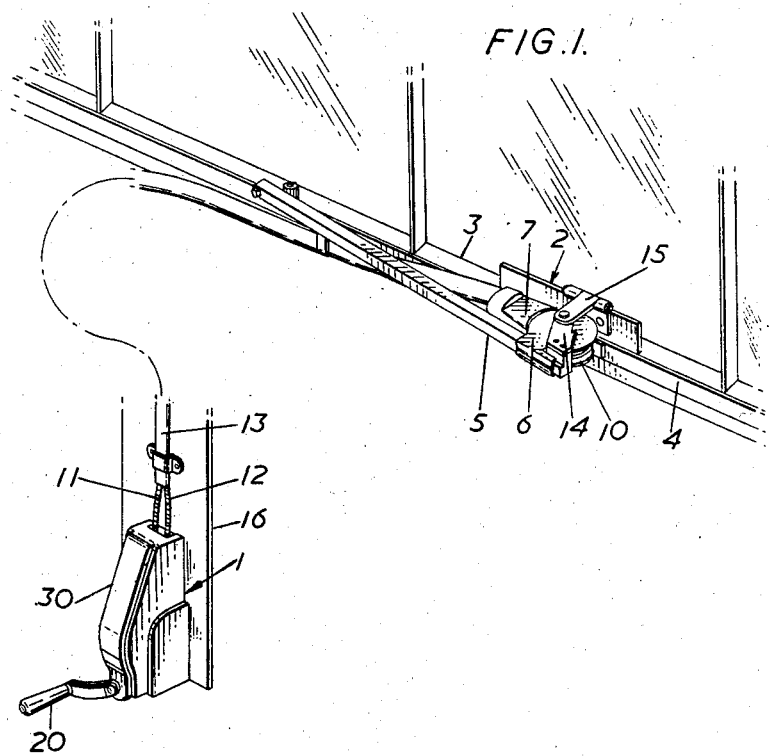
Figure 1 is a somewhat diagrammatic broken perspective view of the control mechanism.

Referring to the drawings, the window-actuating mechanism comprises control mechanism, generally designated 1, located at the control station and controlled mechanism, generally designated 2, at the controlled station, i. e. in the zone of the window in the embodiment now to be described, said two mechanisms being interconnected by flexible transmission means.

The aforesaid controlled mechanism 2, which does not per se form any part of the present invention but forms the subject of my application Serial No. 464,817 of even date herewith, has been shown in the accompanying drawings, and parts thereof will be hereinafter described in order to assist in explaining the operation of the control mechanism according to the present invention.

The controlled mechanism shown in Figure 1 is disposed for swinging a top-hung window 3 with respect to its frame 4 and comprises a window stay 5 slidably mounted in a carriage 6 which is pivotally mounted on a pin extending from an end unit 7, the said end unit 7 being secured to the fixed window frame 4 preferably in a manner affording slight rocking movements about an axis disposed at right-angles with respect to the pivotal axis of the carriage 6.

The end unit 7 is recessed to receive the carriage 6 and is cored to enable two cables 8 and 9 (see Figures 2 and 3) to pass therethrough for engagement with a roller 10 which is rotatably housed in the said carriage, the said cables being of stranded wire and being housed in coiled wire casings 11 and 12 which are themselves housed in a common outer casing 13 of plastic material.

The inner end of the window stay 5 is provided with a bracket 14 which is pivotally connected to the forwardly extending arm 15 of a hinged bracket secured to the movable window frame 3.

The pivotal connection between the parts 14 and 15 and pivotal axis of the carriage 6 are concentric when the parts are in the position shown in Figure 1 and rotation of the roller 10 pursuant to a pull on the appropriate one of the cables 8 and 9 will rotate the stay 5 and carriage 6 into a limiting position in which the stay extends at right-angles from the window when continued pull will cause the stay to slide with respect to its carriage so opening the window. Closing of the window and eventual restoration of the stay 5 to its nested condition can be achieved by pulling on the other of the said two cables.

The means 1, for winding-in and paying out the respective cables are in the nature of a winch and this will now be described in detail. This winch comprises a base plate 16 on which is located a frame 17 housing a rotatably mounted drum unit for engagement by the aforesaid cables 8 and 9, such drum unit being itself driven by a worm wheel 18 engaging a worm 19 housed in the frame 17, and having a spindle to which an operating crank handle 20 is fitted.

The drum unit may comprise drum portions 21 and 22 for engagement by the cables 8 and 9 respectively and said drum portions and the centrally disposed worm wheel 18 may be integrally formed. It is preferred however to make the said drum portions and worm wheel as separate components and to provide for their being fixedly secured together in various angular positions so as to provide for any necessary adjustments in the relative positions of the two cables.

The ends of the cables 8 and 9 may be secured to the aforesaid drum portions in any convenient manner but it is preferred to effect this by means of terminal blocks 23 which are insertable into recesses in the end faces of the said drum portions, such recesses having exit channels 24 for enabling the cables to pass to periphery of the drum and the cables being anchored to the terminal units for instance by set screws passing into bores provided for receiving the cable ends.

In order to prevent undue strain being applied to the aforesaid cables, such for instance as would be the case by rotating the winch beyond the position which corresponds to one of the cables being fully wound in, positive stop means are provided. In the arrangement shown in the drawings these stop means comprise two oppositely acting pawls 25 and 26, the pawl 26 being disposed for co-operation with a notch 27 in the drum portion 22 in preventing rotation of the drum unit beyond a limiting position in a clockwise direction as viewed in Figures 2 and 3, and the pawl 25 being disposed for co-operation with a corresponding notch in the drum portion 21 in preventing the drum unit from rotating beyond a limiting position in an anticlockwise direction as viewed in the said figures. The said pawls 25 and 26 are resiliently urged towards the associated drum portions by means of a spring 28.

The aforesaid notches for the pawls 25 and 26 are provided in those surfaces with which the cables make engagement so that if the wound-up portion of the cable extends over the notch then the pawl is prevented from entering into engagement therewith and the drum unit is free to be rotated in both directions. In order to ensure that in no circumstances can the pawl pass the side of the cable the said pawls may be provided with transverse plates or lugs, such as the plate 29 shown in Figures 2 and 3 in association with the pawl 26, which completely fill the space for accommodating the said cables.

The working parts of the above described winch are enclosed within a cover 30 which is shown in full lines in Figure 1 and in chain lines in Figure 3.

Whilst I have hereinbefore described one embodiment of the present invention it is to be understood that there may be various changes without departing from the scope of such invention. Thus for instance means other than those specifically described may be provided for limiting the rotary movement of the cable engaging drums and the control device may be used for actuating various mechanisms other than that described. Thus for instance the winch may be used for conveying movement to cables which serve to actuate a member disposed for rotation only or for reciprocatory movement only as opposed to member disposed for reciprocatory and angular movements.

I claim:

1. A rotary control assembly for cable winch devices comprising a stationary frame, a winding drum rotatably secured to said frame, said drum having a notch in the periphery thereof, means for driving said drum in either a winding or an unwinding direction, pawl means secured to said frame adjacent said winding drum and adapted to cooperate with said notch to prevent rotation of said drum in the unwinding direction, and a cable adapted to be wound about the periphery of the drum to cover the notch thereon and prevent engagement of said pawl means with said notch, so that when said cable is completely unwound from said drum said pawl means will engage said notch to prevent further rotation of the drum in the direction of unwinding.

2. A rotary control assembly for cable winch devices comprising a stationary frame, two winding drums rotatably secured to said frame, each of said drums having a notch in the periphery thereof, means for simultaneously driving one of said drums in a winding direction and the other of said drums in an unwinding direction, pawl means secured to said frame adjacent each of said drums, each of said pawl means being adapted to cooperate with the notch on the associated drum to prevent rotation of the drum in its unwinding direction, and a cable associated with each of said drums and adapted to be wound about the periphery thereof intermediate said pawl means and said drum, whereby when said cables are wound upon said drums said pawl means are prevented from engaging said notches, and when either of said cables is completely unwound from its associated drum the associated pawl means engages the notch thereon to prevent further rotation of that drum in the direction of unwinding.

3. A rotary control assembly as defined in claim 2 wherein the driving means for said drums includes a worm wheel secured to said drums, and a driving wheel and crank secured to said frame to drive said worm wheel in either direction as desired.

4. A rotary control assembly as defined in claim 2 wherein said pawl means includes a pawl member associated with each of said drums, each of said pawl members having a width equal to the width of the portion of the periphery of said drums upon which said cables are wound.

5. A rotary control assembly as defined in claim 2 wherein said drums are secured to each other on a common axis of rotation.

References Cited in the file of this patent

UNITED STATES PATENTS

| | | |
|---|---|---|
| 1,602,878 | Brown | Oct. 12, 1926 |
| 2,178,066 | Clark | Oct. 31, 1939 |

FOREIGN PATENTS

| | | |
|---|---|---|
| 112,370 | Sweden | Nov. 14, 1944 |
| 424,814 | Great Britain | Feb. 28, 1935 |
| 810,776 | France | Jan. 6, 1937 |